(12) United States Patent
Engle et al.

(10) Patent No.: US 11,919,433 B1
(45) Date of Patent: Mar. 5, 2024

(54) BUNK BOARD RUNNER PADDING AND UNDERLAYMENT

(71) Applicants: Paul M Engle, Aurora, CO (US); Paul J Engle, Sioux City, IA (US)

(72) Inventors: Paul M Engle, Aurora, CO (US); Paul J Engle, Sioux City, IA (US)

( * ) Notice: Subject to any disclaimer, the term of this patent is extended or adjusted under 35 U.S.C. 154(b) by 0 days.

(21) Appl. No.: 18/239,685

(22) Filed: Aug. 29, 2023

(51) Int. Cl.
*B60P 3/10* (2006.01)

(52) U.S. Cl.
CPC .................................. *B60P 3/1066* (2013.01)

(58) Field of Classification Search
None
See application file for complete search history.

(56) References Cited

U.S. PATENT DOCUMENTS

| | | | |
|---|---|---|---|
| 9,771,013 B1* | 9/2017 | Delanghe | B32B 3/266 |
| 2004/0256836 A1* | 12/2004 | MacKarvich | B60P 3/1033 |
| | | | 280/414.1 |
| 2007/0170692 A1* | 7/2007 | MacKarvich | B60P 3/1066 |
| | | | 280/414.1 |
| 2009/0174170 A1* | 7/2009 | Remedios | B60P 3/1066 |
| | | | 280/414.1 |
| 2014/0377045 A1* | 12/2014 | Harms, Jr. | B60P 3/1066 |
| | | | 414/537 |
| 2015/0298779 A1* | 10/2015 | Swart | B63C 3/00 |
| | | | 248/346.11 |

* cited by examiner

*Primary Examiner* — Tony H Winner
(74) *Attorney, Agent, or Firm* — Donald Debelak

(57) ABSTRACT

The method and use of the padding and underlayment device and method disclosed is directed to method and device for supporting the hull of a watercraft using a bunk board with an underlayment pad or cushion attached to the bunk board, the underlayment pad cushion is constructed with an closed cell foam structure that has little to no water absorption and is 2.5 mm to 12 mm thick, the method also includes the option utilizing closed cell foam as bunk board cover over the bunk board padding and underlayment closed cell foam.

13 Claims, 7 Drawing Sheets

BUNK BOARD RUNNER PADDING AND UNDERLAYMENT

BACKGROUND

A boat trailer with the normal upholstery cover over the bunk board may encounter a variety of problems, especially when it remains submerged in a lake, bay or other body of water for a protracted period of time. The primary problem is the fabric (typically made of carpet material) in bunk board covers becomes saturated with water, breaks down and weakens and as a result can tear easily. An wet carpet also is very slow to dry, meaning this problem will exist for the first day, and may also exist for an extended time. The most critical part of this problem is that an overly saturated and weakened bunk board runner cover will easily tear or break then that torn or damaged bunk board cover on a trailer may cause damage to the boat. Although the foregoing difficulties may largely be avoided by removing the watercraft from the water and transporting the watercraft to a storage location when the watercraft is not in use, this approach is seldom employed, since a significant effort is generally required to remove and transport the watercraft, and is particularly inconvenient in situations where the watercraft is subject to frequent use. There are thermoplastic covers available, rather than carpet covers but these don't provide a cushion when the trailer is moving, nor do they provide as much protection when the boat is loaded or unloaded from the trailer. These thermoplastic covers typically lead to damage to the boats fiberglass paint, or finish, the proposed closed cell foam cover or underlayment and padding would prevent such damage.

In addition to bunk boards on trailers, those same products are used in boat storage locations, both on boat lifts and boat holders, where the same concern about torn bunk board and bunk board covers exist. Another issue is that saturated bunk board covers will lead to premature rotting of the bunk board itself, as the bunk board is typically made of wood. As this wood rots and weakens it develops moss and mold and the bunk board is no longer structurally sufficient for the trailer or boat lift.

BRIEF SUMMARY OF THE INVENTION

The invention is a method of creating a bunk board padding and underlayment that has little to no absorption of water through the use of a closed cell foam device rather than through the use of carpet, felts, woven needle punch, or buffeted material. This method minimizes or resolves the problem with carpet material drying slowly, and also being prone to tearing and other damage when used when wet. The wet carpet material breaks down and does not provide good cushioning and the boat may be damaged while being loaded and unloaded and also in transit. The method may use the closed cell foam underlayment and padding alone, use it with closed cell foam padding and underlayment with a closed cell padding and underlayment cover, or with a commercially available or homemade cover out of material other than closed cell foam.

The method of this application is to use a closed cell foam device as padding or as an underlayment for bunk board that can be than with or without a covering layer produced from closed cell foam or carpet or other material. What is unique about the method of this application is first that an underlayment is not frequently used on boat trailers, and where it is the underlayment is carpet material, the total bunk board cover is two layers of carpet material, leading to additional water absorption. The second unique feature is the use of closed cell foam, which may have an anti-microbial treatment, as an underlayment that provides padding that rests on the bunk boards. The closed cell foam can be produced in many materials, some of which are sponge rubber, neoprene, silicon, polyurethane, polyethylene, EVA (ethylene vinyl acetate), EPDM (ethylene propylene diene monomer), TPE (thermoplastic elastomer), and POE (polycyclic aromatic hydrocarbons). The closed cell foam may be configured from 2.5 mm to 12 mm thick.

This new concept of boat bunk runner technology produces a boat bunk runner that dries quickly, provides cushioning for when the boat trailer is loaded/unloaded with a boat, and while the trailer loaded with a boat is in transit. Having a bunk board cover and padding that dries quickly minimizes the possibility of tearing or other damage to the boat board runner cover due to its weakness while wet. Having a closed cell foam act as padding or underlayment also allows the bunk board, or bunk board runner to quickly dry out and reduce the possibility of rot, failure or fatigue.

Bunk boards are typically two inches high by four inches wide planks, but maybe other sizes. The bunk board runner padding and underlayment can be configured in a rectangular shape, with the middle of the bottom edge absent so it fits around the board, or shaped to fit entirely around the board with a slit in the middle of the bottom, or it can be shaped to just come over the sides, or cut to simply fit on top of the bunk board. The bunk board padding and underlayment may have an adhesive layer. The bunk board runner and underlayment may be configured in different sizes to fit bunk boards that are not two inches thick by four inches wide.

BRIEF DESCRIPTION OF DRAWINGS

FIG. 1 shows a boat trailer and points out the bunk board that the device of this application fits over or on.

FIG. 7 shows the padding on top with a cover about to be put on

DESCRIPTION OF NUMBERING CALLOUTS ON THE DRAWINGS

Figure 1:
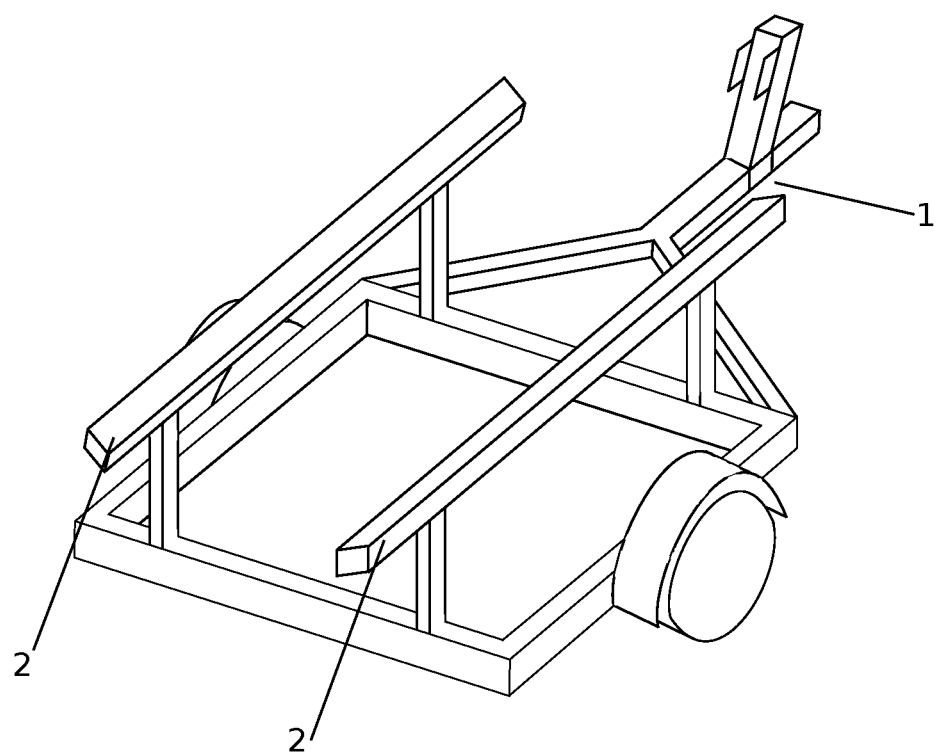

1. Boat trailer
2. Bunk boards on trailers
3. Bunk board not attached to boat
4. Bunk board padding and underlayment with a slit on bottom
5. Slot opening in the bunk board pad and underlayment
6. Bunk board padding and underlayment with a slot opening on the bottom.

7. Slit on the bottom of a bunk board runner.
8. Bunk board runner padding and underlayment with a carpet cover that wraps only around the side.
9. Bottom opening that runs the width of the bunk board runner
10. Carpet cover on the top of the bunk board cover and underlayment
11. Bunk board cover and underlayment
12. Padding and underlayment that sits just on top
13. Cover before being attached

DETAILED DESCRIPTION

FIG. 1 is a boat trailer 1 with a simple configuration, with two bunk boards 2, boat trailers come in a wide variety of configurations and many have more than two bunk boards 2, but the important consideration is that most boat trailers have two or more bunk boards.

Figure 2:
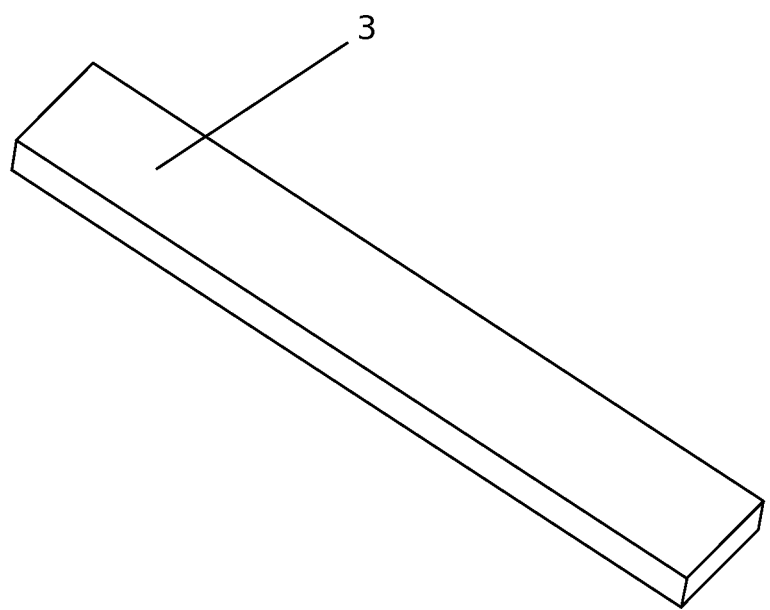
FIG. 2 shows a bunk board without being attached to a boat.

FIG. 2 is one embodiment of the bunk board runner padding and underlayment 3 which has a slit on the bottom (not shown), the slit to allow the embodiment to adapt for posts or other structures that hold the bunk boards away from the frame of the boat trailer 1.

Figure 3:
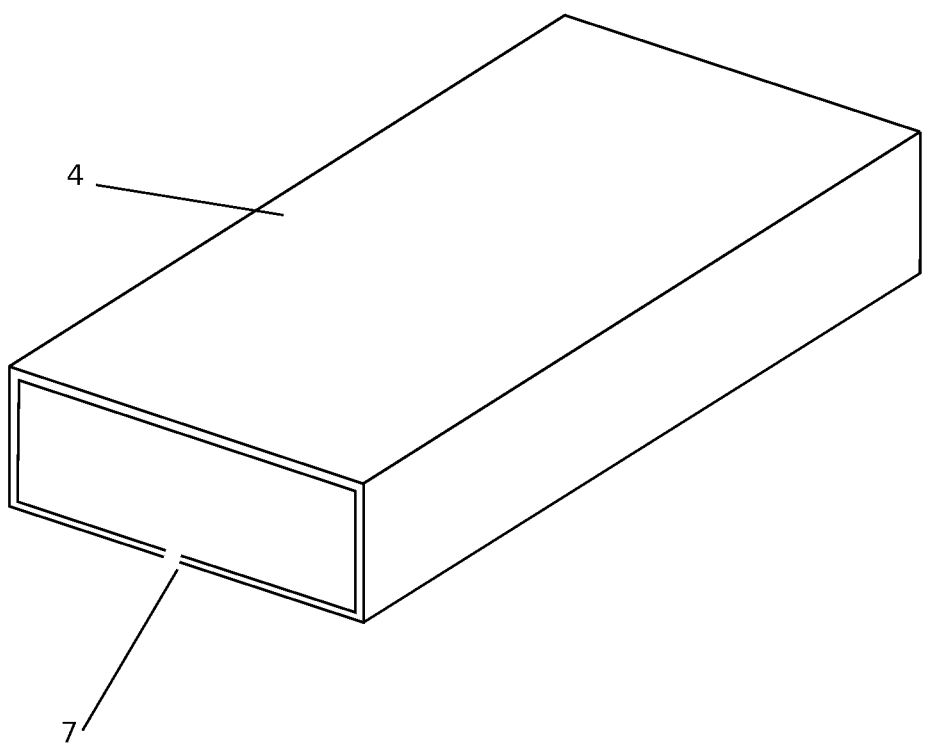
FIG. 3 shows the bunk board runner padding and underlayment where it goes partially around the bottom and where there is a slit in the bottom to help it go over the mounting posts that connect the bunk board to the boat.

FIG. 3 is another embodiment, in this embodiment 4 rather than a slit on the bottom, there is a slot 5 to allow the embodiment to adapt for posts and other structures that hold the bunk boards away from the frame of the boat trailer 1.

Figure 4:
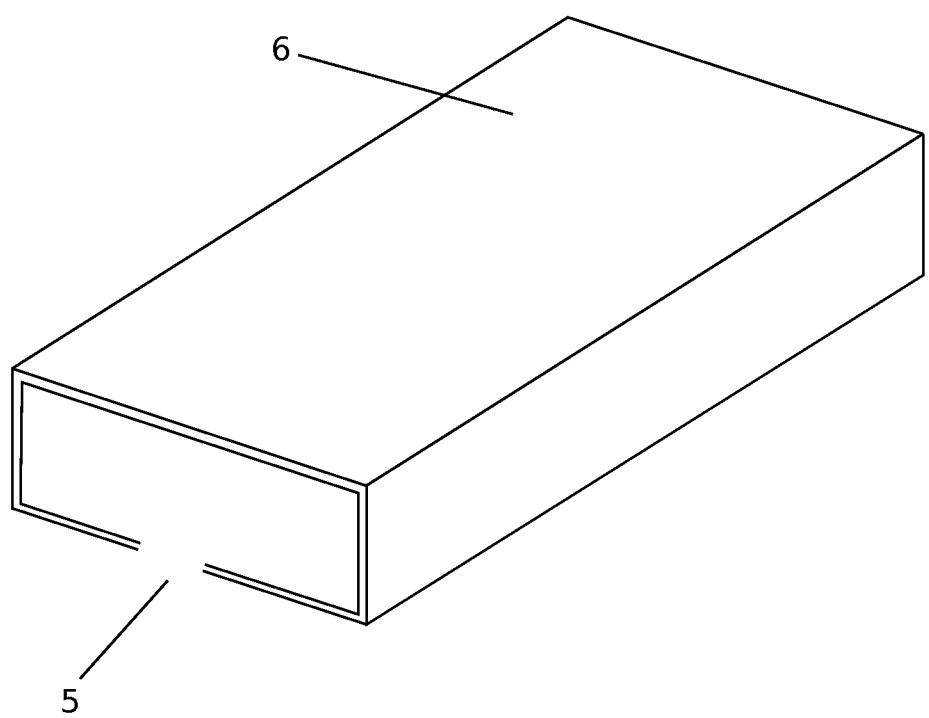
FIG. 4 shows the bunk board runner padding and underlayment where it goes partially around the bottom and where there is a slot, approximately one to two inches wide, on the underside that leaves space for a posts (or other structures) that attach the bunk runner to the boat trailer.
Figure 5:
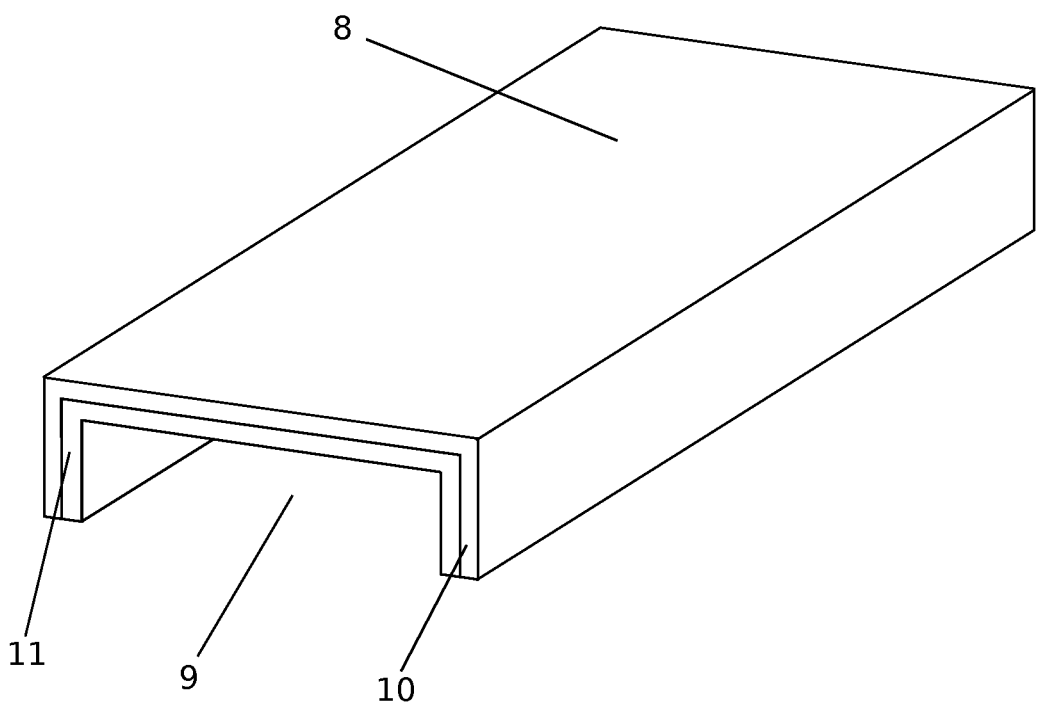
FIG. 5 shows the bunk board runner padding and underlayment where it only goes down the side of the bunk board runner, and does not go underneath the bunk board, it also shows a bunk board cover over the padding and underlayment.

FIG. 4 is another embodiment 6, this one with a top and sides, but nothing on the bottom, this embodiment having flexibility to adapt for how the bunk board runner attaches to the boat trailer FIG. 5 shows the bunk board runner padding and underlayment with a slot opening 4 on the bottom with a bunk board runner cover 7 on top. The bunk board runner cover 7 could be any of the commercially available, or home constructed bunk board covers.

Figure 6:
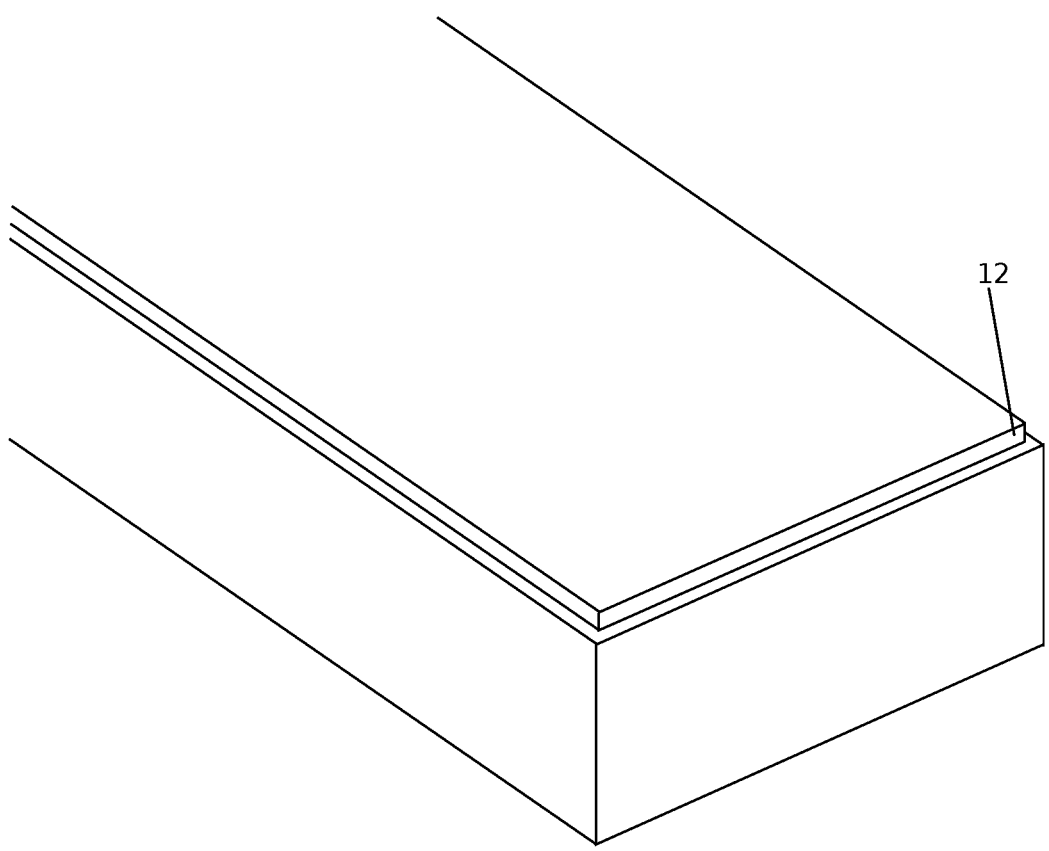
FIG. 6 shows the padding just on top with an adhesive

FIG. 6 shows an embodiment of the padding and underlayment 12 just on the top of the bunk board.

Figure 7:
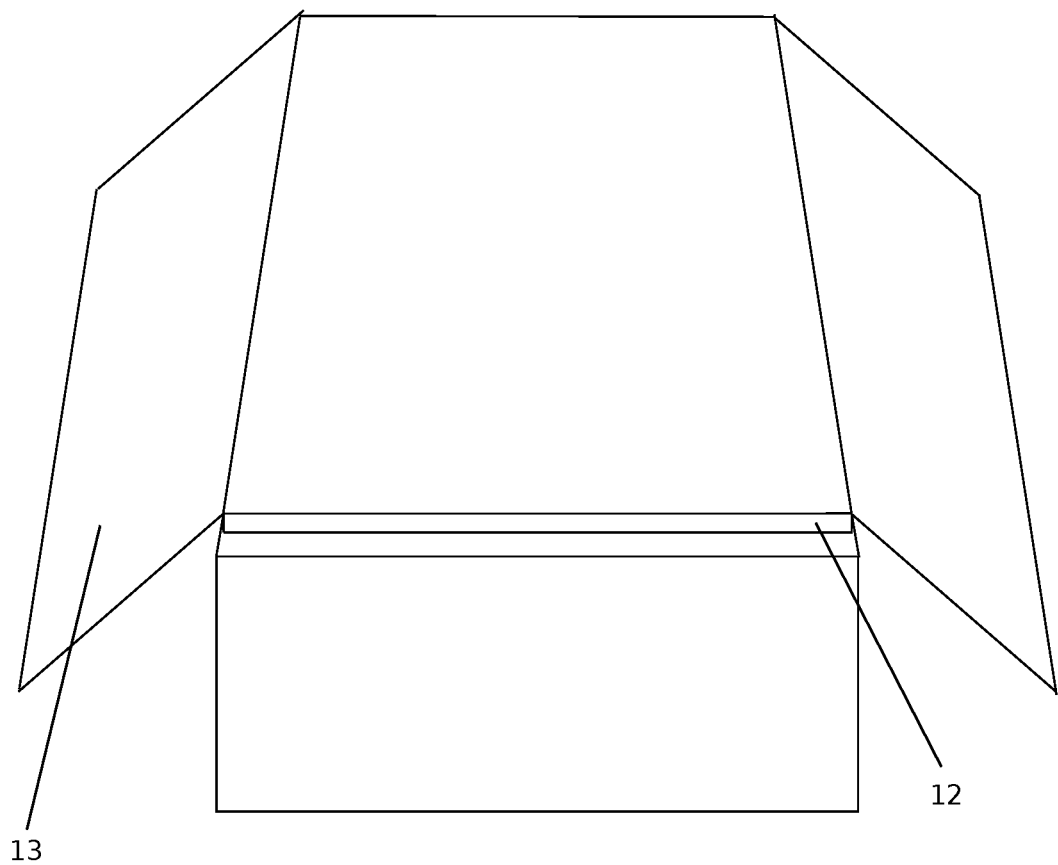

FIG. 7 shows the padding an underlayment 12 just on the top of the bunk board and a bunk board cover 13 before it is attached.

We claim:

1. A method for minimizing drying time of bunk board covers, while increasing the bunk board cushioning effects, comprising:
    selecting a closed cell foam;
    producing a bunk board runner padding and underlayment material from the closed cell foam;
    adding an antimicrobial treatment to the bunk board padding and underlayment material,
    configuring the closed cell foam underlayment material into a configuration that will fit on a top, around the sides and partially a bottom of the bunk board;
    placing the closed cell bunk board padding and underlayment with or without adhesive on a boat trailer's bunk boards;
    placing a closed cell foam cover over the padding and underlayment material.

2. A bunk board padding and underlayment device comprising
    a 2.5 mm to 12 mm closed cell foam material;
    the closed cell foam having an antimicrobial treatment;
    the padding and underlayment device configured to fit over bunk board runner, covering over a top, sides and partially a bottom of the bunk board,
    an adhesive attaches to a side of the bunk board runner padding and underlayment device that sits next to the bunk board.

3. The method of claim 1 wherein the closed cell is optionally closed cell polyethylene, neoprene, silicon, polyurethane EVA (ethylene vinyl acetate), EPDM ethylene propylene diene monomer), TPE (thermoplastic elastomer) and POE (polycyclic aromatic hydrocarbons) material.

4. The method of claim 1 wherein a there is not a cover over the closed cell foam cover over the padding and underlayment material.

5. The method of claim 1 wherein the cover is a commercially available or home produced bunk board cover.

6. The method of claim 1 wherein an adhesive is not used.

7. The method of claim 1 wherein there is not the antimicrobial treatment added to the bunk board padding and underlayment material.

8. The device of claim 2 wherein the portion of bunk board runner padding and underlayment on the bottom of the bunk board runner is a slit approximately ⅛ inch to ¾ inch wide.

9. The device of claim 2 wherein a portion of the bunk board runner padding and underlayment device on the bottom of the bunk board runner has a slot approximately one to three inches wide.

10. The device of claim 2 wherein there is no covering of the bottom of the bunk board runner.

11. The device of claim 2 wherein there is no adhesive attached to a side of the bunk board runner padding and underlayment device that sits next to the bunk board.

12. The device of claim 2 wherein regarding the padding and underlayment device configured to fit over bunk board runner comprised of the cell foam material, the cell foam material used for the padding and underlayment device, does not have an antimicrobial treatment.

13. The device of claim 2 wherein the closed material is polyethylene, neoprene, silicon, polyurethane, EVA, EPDM, TPE or POA material.

* * * * *